(12) United States Patent
Wadland et al.

(10) Patent No.: US 8,789,060 B1
(45) Date of Patent: Jul. 22, 2014

(54) DETERMINISTIC, PARALLEL EXECUTION WITH OVERLAPPING REGIONS

(75) Inventors: Ken Wadland, Grafton, MA (US); Charles W. Grant, Leominster, MA (US); Randall Lawson, Westford, MA (US); Richard Allen Woodward, Jr., San Diego, CA (US); Sean Bergan, Andover, MA (US)

(73) Assignee: Cadence Design Systems, Inc., San Jose, CA (US)

( * ) Notice: Subject to any disclaimer, the term of this patent is extended or adjusted under 35 U.S.C. 154(b) by 1533 days.

(21) Appl. No.: 11/965,695

(22) Filed: Dec. 27, 2007

(51) Int. Cl.
 *G06F 9/46* (2006.01)
 *G06F 13/00* (2006.01)
 *G06F 9/45* (2006.01)

(52) U.S. Cl.
 USPC ............ 718/102; 718/104; 711/150; 703/2; 703/22

(58) Field of Classification Search
 None
 See application file for complete search history.

(56) References Cited

U.S. PATENT DOCUMENTS

| | | | |
|---|---|---|---|
| 5,119,317 A | 6/1992 | Narikawa et al. | |
| 5,245,550 A | 9/1993 | Miki et al. | |
| 5,644,500 A | 7/1997 | Miura et al. | |
| 6,324,675 B1 | 11/2001 | Dutta et al. | |
| 6,370,673 B1 | 4/2002 | Hill | |
| 6,543,043 B1 | 4/2003 | Wang et al. | |
| 6,574,788 B1 * | 6/2003 | Levine et al. | 716/102 |
| 6,681,241 B1 * | 1/2004 | Fagen et al. | 718/104 |
| 6,760,324 B1 | 7/2004 | Scott et al. | |
| 7,069,555 B1 * | 6/2006 | Tzen | 718/102 |
| 7,402,897 B2 | 7/2008 | Leedy | |
| 7,457,279 B1 | 11/2008 | Scott et al. | |
| 7,464,358 B1 | 12/2008 | Wadland et al. | |
| 7,574,686 B1 | 8/2009 | Wadland et al. | |
| 7,590,639 B1 * | 9/2009 | Ivanova et al. | 1/1 |
| 7,725,643 B1 * | 5/2010 | Boucher | 711/102 |
| 2002/0157075 A1 | 10/2002 | Teig et al. | |
| 2003/0046044 A1 * | 3/2003 | Jain et al. | 703/2 |
| 2004/0073702 A1 | 4/2004 | Rong | |
| 2005/0108231 A1 * | 5/2005 | Findleton et al. | 707/8 |
| 2005/0149634 A1 * | 7/2005 | McKenney | 709/248 |
| 2007/0169042 A1 | 7/2007 | Janczewski | |
| 2008/0229309 A1 * | 9/2008 | McKenney | 718/100 |
| 2010/0106921 A1 * | 4/2010 | Glasco et al. | 711/154 |

* cited by examiner

Primary Examiner — Abdullah Al Kawsar

(74) Attorney, Agent, or Firm — Vista IP Law Group, LLP

(57) ABSTRACT

A method, computer program product and apparatus for utilizing simulated locking prior to starting concurrent execution are disclosed. The results of this simulated locking are used to define a canonical ordering which controls the order of execution and the degree of parallelism that can be used.

18 Claims, 38 Drawing Sheets

| O | P | C | | T |
|---|---|---|---|---|
| J | F | S | A | L |
| R | B | E | | N |
| K | | D | G | M |
| I | Q | H | U | |

| O | P | C | | T |
|---|---|---|---|---|
| J | F | S | A | L |
| R | B | E | | N |
| K | | D | G | M |
| I | Q | H | U ||

Decision Queue: A,B,C,D,E,F,G,H,I,J,K,L,M,N,O,P,Q,R,S,T,U

Task Queue: <empty>

Committed: <empty>

FIG. 8

| O<br>F,J,P | P<br>C,F,J,O,S | C<br>A,F,L,P,S,T | | T<br>A,C,L |
|---|---|---|---|---|
| J<br>B,F,O,P,R | F<br>B,C,E,J,O,P,R,S | S<br>A,B,C,E,F,P | A<br>C,D,E,G,L,M,N,S,T | L<br>A,C,N,T |
| R<br>B,F,I,J,Q | B | E<br>A,B,D,F,G,S | | N<br>A,D,G,L,M |
| K<br>B,I,Q,R | D,E,F,I,J,K,Q,R | D<br>A,B,E,F,G,H,Q | G<br>A,D,E,H,M,N,U | M<br>A,G,N,U |
| I<br>B,K,Q | Q<br>B,D,H,I,K | H<br>B,D,G,Q,U | U<br>D,G,H,M | |

Decision Queue: A,B,C,D,E,F,G,H,I,J,K,L,M,N,O,P,Q,R,S,T,U

Task Queue: <empty>

Committed: <empty>

FIG. 9

| | | A | | A | |
|---|---|---|---|---|---|
| O | P | C | | T | |
| F,J,P | C,F,J,O,S | A,F,L,P,S,T | | A,C,L | |
| J | F | A S | A#1 | A L | |
| B,F,O,P,R | B,C,E,J,O,P,R,S | A,B,C,E,F,P | | A,C,N,T | |
| R | B | A E | C,D,E,G,L,M,N,S,T | A N | |
| B,F,I,J,Q | | A,B,D,F,G,S | | A,D,G,L,M | |
| K | | A D | A G | A M | |
| B,I,Q,R | D,E,F,I,J,K,Q,R | A,B,E,F,G,H,Q | A,D,E,H,M,N,U | A,G,N,U | |
| I | Q | H | U | | |
| B,K,Q | B,D,H,I,K | B,D,G,Q,U | D,G,H,M | | |

Decision Queue: B,C,D,E,F,G,H,I,J,K,L,M,N,O,P,Q,R,S,T,U

Task Queue: A

Committed: <empty>

FIG. 10

| | | | | |
|---|---|---|---|---|
| O<br>F,J,P | P<br>C,F,J,O,S | A<br>C<br>A,F,L,P,S,T | A<br>T<br>A,C,L | |
| B<br>J<br>B,F,O,P,R | B<br>F<br>B,C,E,J,O,P,R,S | A,B<br>S<br>A,B,C,E,F,P | *A#1* | A<br>L<br>A,C,N,T |
| B<br>R<br>B,F,I,J,Q | *B#2*<br>*D,E,F,I,J,K,Q,R* | A,B<br>E<br>A,B,D,F,G,S | *C,D,E,G,L,M,N,S,T* | A<br>N<br>A,D,G,L,M |
| B<br>K<br>B,I,Q,R | | A,B<br>D<br>A,B,E,F,G,H,Q | A<br>G<br>A,D,E,H,M,N,U | A<br>M<br>A,G,N,U |
| B<br>I<br>B,K,Q | B<br>Q<br>B,D,H,I,K | B<br>H<br>B,D,G,Q,U | U<br>D,G,H,M | |

Decision Queue: C,D,E,F,G,H,I,J,K,L,M,N,O,P,Q,R,S,T,U

Task Queue: A,B

Committed: <empty>

FIG. 11

| | | A C | A T |
|---|---|---|---|
| O<br>F,J,P | P<br>C,F,J,O,S | A,F,L,P,S,T | A,C,L |
| B<br>J<br>B,F,O,P,R | B<br>F<br>B,C,E,J,O,P,R,S | A,B<br>S<br>A,B,C,E,F,P | A#1 | A<br>L<br>A,C,N,T |
| B<br>R<br>B,F,I,J,Q | B#2 | A,B<br>E<br>A,B,D,F,G,S | C,D,E,G,L,M,N,S,T | A<br>N<br>A,D,G,L,M |
| B<br>K<br>B,I,Q,R | D,E,F,I,J,K,Q,R | A,B<br>D<br>A,B,E,F,G,H,Q | A<br>G<br>A,D,E,H,M,N,U | A<br>M<br>A,G,N,U |
| B<br>I<br>B,K,Q | B<br>Q<br>B,D,H,I,K | B<br>H<br>B,D,G,Q,U | U<br>D,G,H,M | |

Decision Queue: D,E,F,G,H,I,J,K,L,M,N,O,P,Q,R,S,T,U

Task Queue: A,B

Committed: <empty>

FIG. 12

| | | A | | A |
|---|---|---|---|---|
| O<br>F,J,P | P<br>C,F,J,O,S | A,F,L,P,S,T C | T<br>A,C,L |
| B<br>J<br>B,F,O,P,R | B<br>F<br>B,C,E,J,O,P,R,S | A,B<br>S<br>A,B,C,E,F,P | A #1 | A<br>L<br>A,C,N,T |
| B<br>R<br>B,F,I,J,Q | B #2<br>D,E,F,I,J,K,Q,R | A,B<br>E<br>A,B,D,F,G,S | C,D,E,G,L,M,N,S,T | A<br>N<br>A,D,G,L,M |
| B<br>K<br>B,I,Q,R | | A,B D<br>A,B,E,F,G,H,Q | A<br>G<br>A,D,E,H,M,N,U | A<br>M<br>A,G,N,U |
| B<br>I<br>B,K,Q | B<br>Q<br>B,D,H,I,K | B<br>H<br>B,D,G,Q,U | U<br>D,G,H,M | |

Decision Queue: E,F,G,H,I,J,K,L,M,N,O,P,Q,R,S,T,U

Task Queue: A,B

Committed: <empty>

FIG. 13

|       O       |       P       | A              C              | A       |
|---------------|---------------|-------------------------------|---------|
| F,J,P         | C,F,J,O,S     | A,F,L,P,S,T                   | T       |
|               |               |                               | A,C,L   |

| B       | B             | A,B         | A#1         | A       |
|   J     |      F        |    S        |             |    L    |
| B,F,O,P,R | B,C,E,J,O,P,R,S | A,B,C,E,F,P |         | A,C,N,T |

| B       |               | A,B         |               | A       |
|   R     |     B#2       |    E        |               |    N    |
| B,F,I,J,Q |             | A,B,D,F,G,S | C,D,E,G,L,M,N,S,T | A,D,G,L,M |

| B       |               | A,B         | A           | A       |
|   K     |               |    D        |    G        |    M    |
| B,I,Q,R | D,E,F,I,J,K,Q,R | A,B,E,F,G,H,Q | A,D,E,H,M,N,U | A,G,N,U |

| B       | B             | B           |                         |
|   I     |    Q          |    H        |           U             |
| B,K,Q   | B,D,H,I,K     | B,D,G,Q,U   | D,G,H,M                 |

Decision Queue: O,P,Q,R,S,T,U

Task Queue: A,B

Committed: <empty>

FIG. 14

| | | | | |
|---|---|---|---|---|
| O #3<br>F,J,P | O　　P<br>C,F,J,O,S | A　　C<br>A,F,L,P,S,T | | A　　T<br>A,C,L |
| B,O　J<br>B,F,O,P,R | B,O　F<br>B,C,E,J,O,P,R,S | A,B　S<br>A,B,C,E,F,P | A #1 | A　L<br>A,C,N,T |
| B　R<br>B,F,I,J,Q | B #2 | A,B　E<br>A,B,D,F,G,S | C,D,E,G,L,M,N,S,T | A　N<br>A,D,G,L,M |
| B　K<br>B,I,Q,R | D,E,F,I,J,K,Q,R | A,B　D<br>A,B,E,F,G,H,Q | A　G<br>A,D,E,H,M,N,U | A　M<br>A,G,N,U |
| B　i<br>B,K,Q | B　Q<br>B,D,H,I,K | B　H<br>B,D,G,Q,U | U<br>D,G,H,M | |

Decision Queue: P,Q,R,S,T,U

Task Queue: A,B,O

Committed: <empty>

FIG. 15

Decision Queue: U

Task Queue: A,B,O

Committed: <empty>

FIG. 16

Decision Queue: <empty>

Task Queue: A,B,O,U

Committed: <empty>

FIG. 17

Decision Queue: C,L,N,T

Task Queue: B,O,U

Committed: A

Add unblocked neighbors to decision queue

FIG. 18

Decision Queue: L,N,T

Task Queue: B,O,U,C

Committed: A

FIG. 19

Decision Queue: N,T

Task Queue: B,O,U,C

Committed: A

FIG. 20

Decision Queue: T

Task Queue: B,O,U,C,N

Committed: A

FIG. 21

Decision Queue:

Task Queue: B,O,U,C,N

Committed: A

FIG. 22

Decision Queue: E,I,K,Q,R

Task Queue: O,U,C,N

Committed: A,B

FIG. 23

Decision Queue:

Task Queue: O,U,C,N,E,I,R

Committed: A,B

FIG. 24

Decision Queue: <empty>

Task Queue: U,C,N,E,I,R

Committed: A,B,O

Decision Queue: <Empty>

Task Queue: N,E,I,R,H,P,T

Committed: A,B,O,U,C

FIG. 27

Decision Queue: <Empty>

Task Queue: R,H,P,T,M

Committed: A,B,O,U,C,N,E,I

Decision Queue: <Empty>

Task Queue: P,T,M,K,D

Committed: A,B,O,U,C,N,E,I,R,H

Decision Queue: <Empty>
Task Queue: M,K,D,F,L
Committed: A,B,O,U,C,N,E,I,R,H,P,T Decision Queue: <Empty>

Task Queue: L,G,Q,J,S

Committed: A,B,O,U,C,N,E,I,R,H,P,T,M,K,D,F

Decision Queue: <Empty>

Task Queue: <Empty>

Committed: A,B,O,U,C,N,E,I,R,H,P,T,M,K,D,F,L,G,Q,J,S

DETERMINISTIC, PARALLEL EXECUTION WITH OVERLAPPING REGIONS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates to parallel processing and, more particularly, to parallel execution of intensive applications in multi-core systems and computing farms.

BACKGROUND

Multi-core systems and computing farms are becoming increasingly common. This is due, in part, to the increased complexity of single processor systems. Many vendors of desktop computing systems have already shipped multi-core versions of their products, and in the future for there will be dozens of processing cores on a single chip. Also, computing farms are becoming increasingly common due to the improved cost benefit ratio of using many low-cost, low-performance commodity systems instead of using a small number of high-cost, high-performance systems.

Computationally intensive applications, such as many electronic design automation (EDA) applications, that cannot take advantage of parallel execution are at a significant disadvantage in the marketplace. As vendors produce concurrent execution versions of their products to take advantage of parallel execution, there is increasing market pressure for competitors to follow.

The classic example of concurrency is moving funds between two or more bank accounts. If proper care is not taken, then the concurrency could result in data inconsistencies, conflicts, and other problems. For example, a "race condition" can result in incorrect balances when several transactions modify the same bank accounts simultaneously.

There are many examples of EDA applications that may be used in conjunctions with concurrent algorithms but may also face potential race conditions. For printed circuit boards (PCBs), packages and integrated circuits (ICs), an autorouter is typically used to find an initial wiring solution that involves many connections. Once one solution has been found, there are many algorithms to improve the solution, e.g., via reduction, crosstalk reduction, via doubling, track centering, etc., which involve modifying many objects. These solutions may be approached in a concurrent manner.

There are two standard approaches that can be taken to prevent race conditions. The first approach is by locking. The second approach is by partitioning.

Most techniques for preventing race conditions use a locking mechanism to determine the order of execution. When an application needs to modify several data objects, it first acquires the exclusive right to that data. This operation is typically called a "lock". The "lock" is also known as "mutex" (mutual exclusion lock), "semaphore", or "monitor". The simplest concurrency algorithm is to acquire locks to all accessed objects prior to reading/modifying the objects and then release those locks after reading/modifying the objects. In the classic example cited above of moving funds between two banking accounts, the algorithm would acquire locks on all affected accounts prior to modifying any of them. All other transactions accessing any of those accounts will be "blocked" until the earlier algorithm completes and releases the locks on those accounts.

The other common approach to concurrency is partitioning. With this approach, the entire data set is divided into two or more partitions. Execution of the algorithm then proceeds in parallel on each partition. Finally, the results from execution on each partition are merged back into a single solution. For example, in a typical IC autorouter, the entire design is partitioned into regions, sometimes called "cells". A global router first finds a global solution ignoring the details within regions. Then, several copies of a detail router simultaneously find detailed solutions for each region. These regions can be safely executed in parallel since they have no shared data between them.

Locking typically results in non-deterministic results. That is, running the same application on the same data might compute different but equally valid solutions.

In the banking example, if two transactions attempt to withdraw money from the same account, the second transaction might find insufficient funds and reject the transaction. While this operation is safe from a database integrity point-of-view, it means that two different but equally valid outcomes are possible: (1) transaction A succeeds and transaction B fails, or (2) transaction B succeeds and transaction A fails. When thousands of transactions are processed in unpredictable order, it is impractical to predetermine all possible outcomes.

In chaotic systems where small changes in early computations can produce large changes in later computations, non-deterministic results make it impossible to test the system using known good results, e.g., "golden" regression data. It is difficult to develop and debug a system that cannot be tested using known good results.

When partitioning is used, the problem with deterministic results is eliminated. Since all operations only affect their partition, it can be guaranteed that the results of the entire process are the same regardless of the order in which the partitions are reassembled. However, this mechanism can only be used when an isolated partitioning is possible. A partitioning is isolated if and only if each transaction affects only one partition. When the partitions overlap, no such guarantee is possible. In the crosstalk reduction example, if changes in one region affect crosstalk in adjacent regions, it is not possible to define an isolated partitioning.

SUMMARY

The use of locking causes non-deterministic behavior, which makes development and debugging extremely difficult. On the other hand, isolated partitioning is not always possible. Therefore, there is an urgent need for deterministic mechanisms that can operate on overlapping partitions.

In one embodiment, the method, apparatus and medium include providing simulated locking to computational intensive EDA applications.

In an embodiment, run-time selection is made between deterministic and non-deterministic behaviors for tasks operating on regions.

In another embodiment, a problem domain is divided into tasks operating on regions with associated canonical ordering and dispatch dependencies that enable the overall algorithm to be both concurrent and deterministic.

In another embodiment, simulated locking is used to define a canonical ordering, dispatch dependencies and a commit order.

Another embodiment includes use of permits and region sets to quantify allowed concurrency.

Another embodiment includes controlling concurrency scheduling using dispatch dependencies.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 1 illustrates a structure of rectangular regions for an embodiment of the present invention.

FIGS. 7-37 illustrate an example according to an embodiment of the invention.

DETAILED DESCRIPTION

Rather than using locking to determine the execution order, an embodiment of this invention uses simulated locking prior to starting concurrent execution. The results of this simulated locking are used to define a canonical ordering which controls the order of execution and the degree of parallelism.

Figure 1:
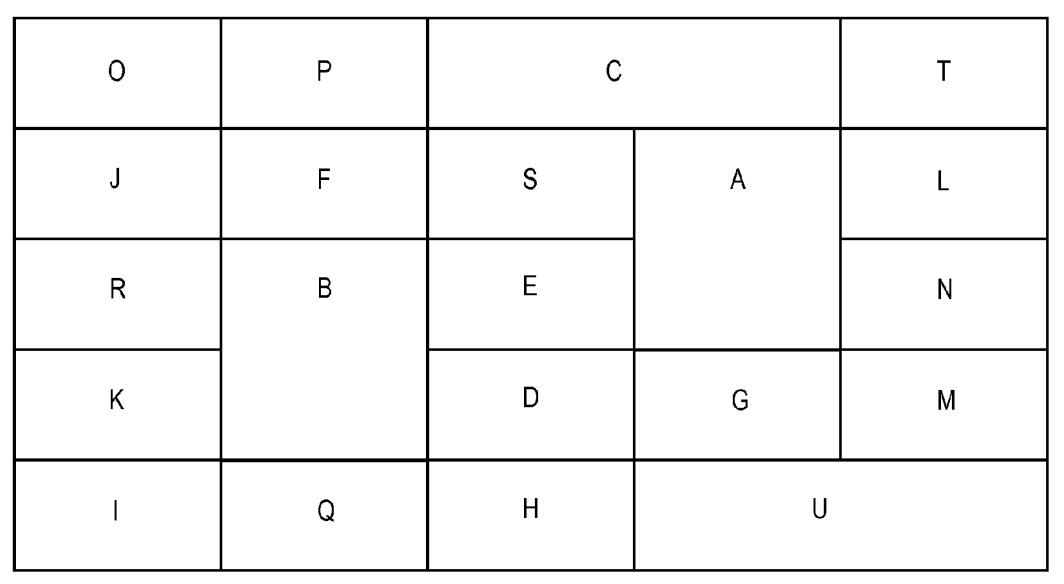

FIG. 1 illustrates an example structure of rectangular regions for an embodiment of the present invention. The structure 100 includes 21 regions A through U. The regions may be different sizes and different shapes.

The problem domain is divided into regions A through U. These regions are subsets of the data objects or the data space. In the embodiment using routers such as with an auto-router, regions are defined geometrically and may be called "cells" or "tiles". In other embodiments, regions may be defined in terms of frequency ranges or time intervals or any other convenient divisions of the problem domain data.

A region set includes one or more regions. Region sets may be defined so as to be adjacent. Thus, geometric region sets may be geometrically contiguous. Time interval region sets may be a time interval that includes all of the regions in that interval. However, there is no requirement that the regions of any region sets need to be adjacent.

A task is a subset of the overall problem. The concurrent algorithm operates by running different tasks in parallel. Each thread of execution (e.g., on a multi-processor system or a distributed system) executes one task at a time until all tasks have been executed.

Figure 2:
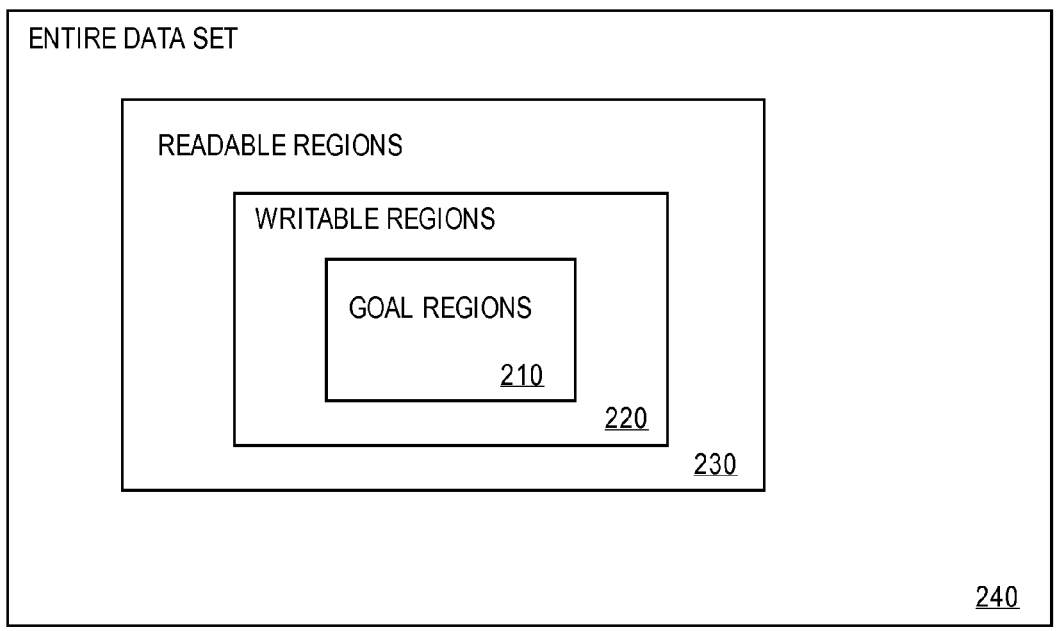
FIG. 2 illustrates example region sets of a permit according to an embodiment of the present invention.

FIG. 2 illustrates example region sets of a permit according to an embodiment of the present invention. The permit 200 includes goal regions 210, which are a subset of writable regions 220, which are a subset of readable regions 230, which are a subset of the entire data set 240.

In one embodiment, each task has an associated permit that defines what data to process and what other data may be modified or accessed. Each permit has three associated region sets, referred to herein as: (1) the goal regions 210, (2) the writable regions 220, and (3) the readable regions 230. The task data includes data in its goal regions. In order to accomplish a task, each thread of the concurrent algorithm may modify any data that resides in one or more of the writable regions for its permit. It may access (e.g., in a read-only fashion) any data that resides in one or more of the readable region for its permit. The set of regions in the goal regions is always a subset of the set of regions of its writable regions, which is always a subset of the set of regions of its readable regions.

In some embodiments, each permit has only one region in its goal regions, its writable regions and its readable regions. In this case, the algorithm may be called an Isolated Partitioning. In other embodiments, there is only one permit that includes all regions in all three of its region sets. In this case, only one task is needed. The algorithm is therefore "Single Threaded." In other embodiments, many tasks can be executing simultaneously but the output of some tasks affects the input of other tasks.

In an embodiment, any division of the problem domain into tasks is possible provided that: (a) the union of the goal regions from all of the tasks is the entire domain space, (b) each task can be performed without modifying data outside its writable regions, and (c) each task can be performed without accessing data outside its Readable Regions.

In some embodiments, for optimal performance, there may be many regions (e.g., typically thousands of Regions) and the region sets may be small (e.g., typically a dozen or fewer regions per region set).

Some embodiments select a "Decision Ordering" from a given set of permits. A decision ordering describes an ordering of tasks that need to be accomplished. This ordering could be accomplished by creating a list of the tasks and sorting by some criteria. In some embodiments, a mechanism call "Simulated Locking" may be applied. Simulated locking is described in detail in FIG. 4. It uses the decision ordering to determine a "Canonical Ordering" of the Permits. Canonical ordering is an ordering that avoids the possible locking situations. Based on the canonical ordering, each task is assigned a specific "Dispatch Dependency", defining which position must be reached in the canonical ordering before its task can be initialized. The algorithm then proceeds to process tasks concurrently following the dispatch dependencies and the canonical ordering until all Tasks are completed.

Use of a Canonical Ordering instead of locking makes the overall process deterministic. This dramatically reduces the complexity of developing and testing algorithms. In particular, this process makes it possible to create a single regression test suite that may be used for both a single-threaded version of the algorithm and a multi-threaded or distributed version of the algorithm.

Figure 3:
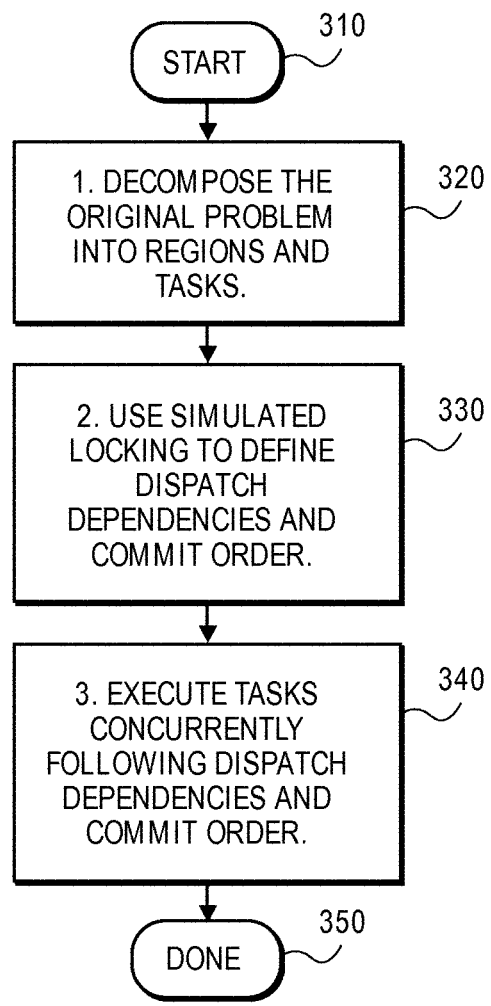
FIG. 3 depicts a generic flow chart according to an embodiment of the present invention.

FIG. 3 depicts a high-level flow chart of an embodiment of the present invention. The flow chart represents a top-level mechanism/process 300 having three parts. Part 1 decomposes the original problem into regions and tasks. Part 2 uses simulated locking to define dispatch dependencies and commit order. Part 3 executes tasks concurrently following dispatch dependencies and commit orders. In an embodiment, Part 3 can be started before Part 2 completes. In other embodiment, these two parts could be combined into one. In some embodiments, Parts 2 and 3 are described separately.

At 310, the mechanism starts. At 320, the original problem is decomposed into Regions and Tasks. In one embodiment, the decomposition starts by dividing the overall problem into Tasks, $T_i$, such that solving each of the tasks sequentially will solve the overall problem. Then, the problem data domains are divided into regions, $R_i$, such that each item of data to be accessed and/or modified by the tasks resides in one or more regions. Then Permits ($P_i$) for each Task are defined with three region sets: goal regions ($G_i$), writable regions ($W_i$) and readable (i.e., Accessible) regions ($A_i$), such that (a) the goal regions are a subset of the writable regions, (b) the writable regions are a subset of the readable regions, (c) all items of data to be modified by the task resides in one or more of the writable regions, and (d) all items of data to be accessed by the task resides in one or more of the readable regions.

Each Task is divided into three parts: Initialization, Computation and Results. The Computation portion may or may not use any global data and may be capable of execution in parallel with any other Tasks. The Results portion stores data object changes in the common database. It may be executed serially and may have order dependencies against other Tasks. The Initialization section is optional. If required, it may access global data, may be executed serially and may have order dependencies against other Tasks. All three portions may obey their permit permissions.

At 330, simulated locking is used to define dispatch dependencies and commit orders. In an embodiment, first, a total ordering on the tasks is defined, called the decision ordering. In some embodiments, decision ordering is defined to be the mathematical concept of a total ordering, which is a binary relation on tasks that is antisymmetric, transitive, and complete. This total ordering could be accomplished by creating a list of tasks and sorting by some criteria.

In one embodiment, if the tasks have an associated name or a number, this could be used to define the decision ordering. In another embodiment, if each permit has a special co-ordinate, such as the center or the upper-left corner, then lexicographic ordering could be used based on this special co-ordinate. In other embodiments, any ordering may be used. Note that, the memory address of the task as stored in the computer memory could not be used, since this might be different if the same data is run again, hence would not be deterministic. In some embodiments, the sort criteria for the decision ordering may be based on the estimated execution time or complexity of each task. For example, the number of objects in its goal regions could be used for sorting.

In another embodiment, a complexity measure may be used to statistically reduce latency. In other embodiments, tasks that are early in the decision ordering may be executed prior to tasks that are late in the decision ordering. Thus, at then end of processing the tasks remaining are likely to be smaller (faster) hence less time is lost.

Whatever sort order is used, it should be a total ordering. In particular, given two different Tasks, one is always "less" then the other. In other embodiments, this assumption might not be true. For example, if the size of a region or the number of objects is used as the sort order since two different regions might have the same size or contain the same number of objects. If this happens, a secondary ordering such as by name or location may be used as a "tie breaker".

In some embodiments, for performance reasons, if the sorting order is complicated to compute, the tasks may be numbered after they are sorted to make subsequent comparisons faster. In some embodiments, once the decision order is determined, the simulated locking may begin.

At 340, tasks are executed concurrently following obtaining dispatch dependencies and commit order. In some embodiments, global shared pointers are defined for the "last-committed" task and the "next-to-commit" task. For example, "last-committed" task is initialized as null and "next-to-commit task is initialized as the "first" task based on the canonical task ordering (e.g., determined earlier). A globally shared queue of tasks may be defined, called the "Work" queue, which is initialized to be empty. With all required data prepared, concurrent operation is performed using "dispatch thread" and "worker threads." At 350, the mechanism ends.

Figure 4:
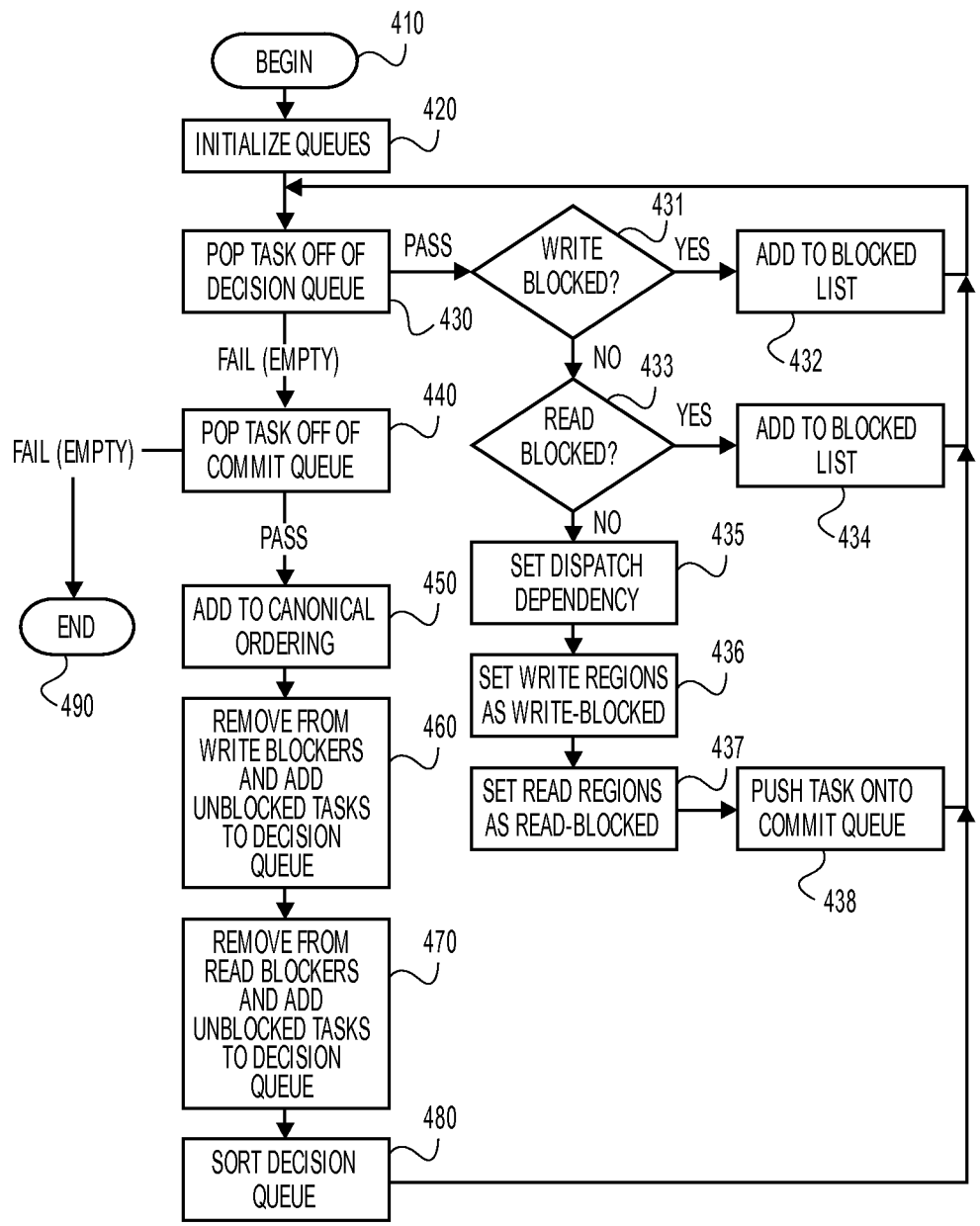
FIG. 4 depicts a flow diagram for simulated locking according to an embodiment of the present invention.

FIG. 4 depicts a flow diagram for simulated locking according to an embodiment of the present invention. At 410, the process starts. At 420, two queues are defined: decision-queue and commit-queue. The decision queue is initialized to consist of all of the tasks in their decision order. The commit-queue is initialized to be empty. A numeric value, called the "commit-order-counter" is initialized to zero and used to define the Commit Order. Each Region has three associated lists of tasks: (1) "Write-Blocker" (i.e., there may be a maximum of one Write Blocker), (2) "Read-Blockers", and (3) "Blocked". All three lists are initially empty.

At 430, the main loop starts by selecting one task to process, call it $T_s$, by popping one task off of the decision queue. The regions in the selected Task's Write Regions ($W_s$) are examined. If any of them have a non-empty "Write-Blocker" 431 or a non-empty "Read-Blocker" 433, then the selected Task ($T_s$) is added to the "Blocked" list 432, 433 for the first such region and another task is popped off the decision queue 430.

Next, all of the Regions in the selected Task's Read Regions ($A_s$) are examined. If any of them has a "Write-Blocker" 431 then the selected Task is added to the "Blocked" list 432 for that Region and another Task is popped off the Decision Queue 430.

If all of the Write Regions have an empty "Write Blocker" 431 and an empty "Read Blocker" list 433 and if all of the Read Regions have an empty "Write Blocker" 431, then processing of the selected Task continues. The "Dispatch Dependency" of the selected Task is set to the current "Last Dispatch Dependency" 435. The selected Task is stored as the "Write Blocker" for all Regions in the Write Regions of the selected Task 436. The selected Task is added to the list of "Read Blockers" for each Region in its "Read Regions" 437. Finally, the selected Task ($T_s$) is added to the Commit Queue 438.

This processing continues until the Decision Queue is empty 430. When it becomes empty, one task $T_s$, is selected and popped off of the Work Queue 440. If this queue is also empty, then all Tasks have been processed and the algorithm exits 490.

Each Region in the Write Regions of the selected Task ($T_s$) should have already been marked with this Region as its Write Blocker. The commit-order-counter is incremented and its new value is stored in the Task and defines its position in the Canonical Ordering 450.

At 460, the selected task is removed from the "Write Blocker" list for each Region in the Write Regions for its Permit. If any of these Regions has any Tasks in its "Blocked" list, then those Tasks are added to the Decision Queue and their Dispatch Dependency is set to the selected Task ($T_s$).

At 470, the selected task is removed from the "Read Blocker" list for each Region in the Read Regions for its Permit. If this was the last item in the "Read Blocker" list any of Region and if that Region had any Tasks in its "Blocked" list, they are added to the Decision Queue and their Dispatch Dependency is set to the selected Task ($T_s$).

At 480, the new contents of the Decision Queue are now sorted by the "Decision Order". Then, if non-empty, a new Task is selected by popping it off the Decision Queue and processing it as above. If it is empty, then a new Task is selected by popping it off the Commit Queue and processing it as above. If both queues are empty, then this part of the algorithm is done.

Figure 5:
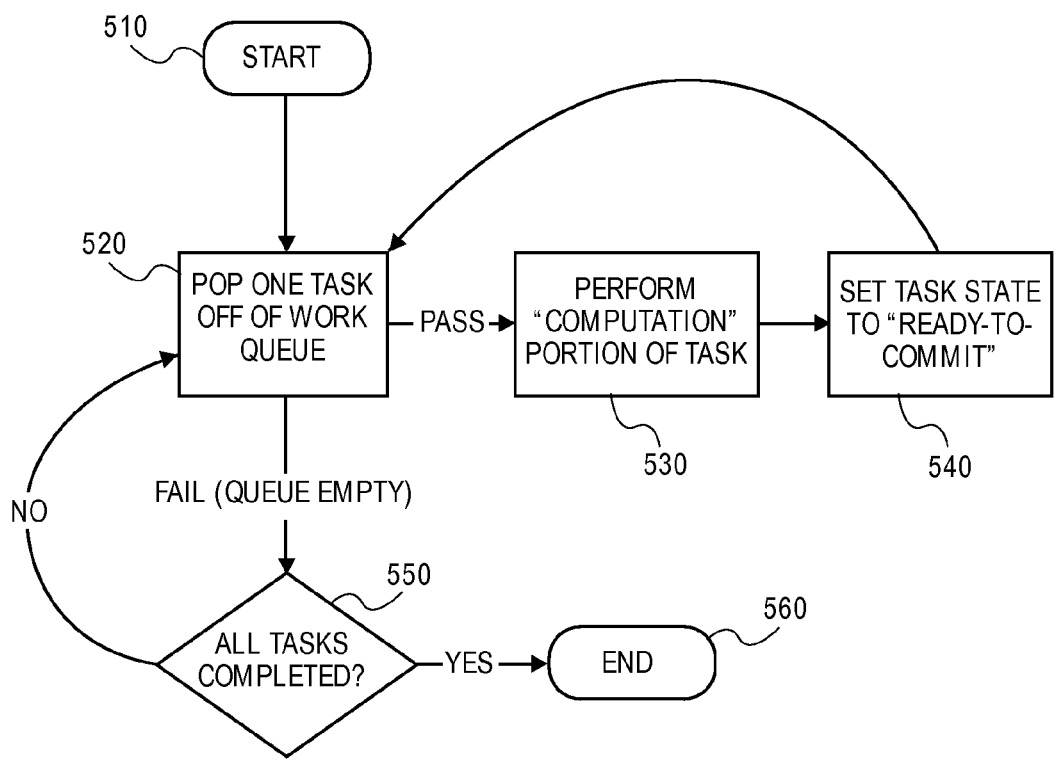
FIG. 5 depicts a flow diagram for worker threads according to an embodiment of the present invention.

FIG. 5 depicts a flow diagram for worker threads 500 according to an embodiment of the present invention. At 510 the worker thread process starts. At 520, each Worker Thread operates by popping a Task off the shared Work Queue and executing the "Computation" portion of that Task 530. When the Computation portion of the Task has been completed, set the status of that Task to "ready-to-commit" and pop another Task off the Work Queue 540. At 550, when the Work Queue is empty, the Worker Threads wait until it becomes non-empty or until all Tasks have been completed. At 560, this process ends.

Figure 6:
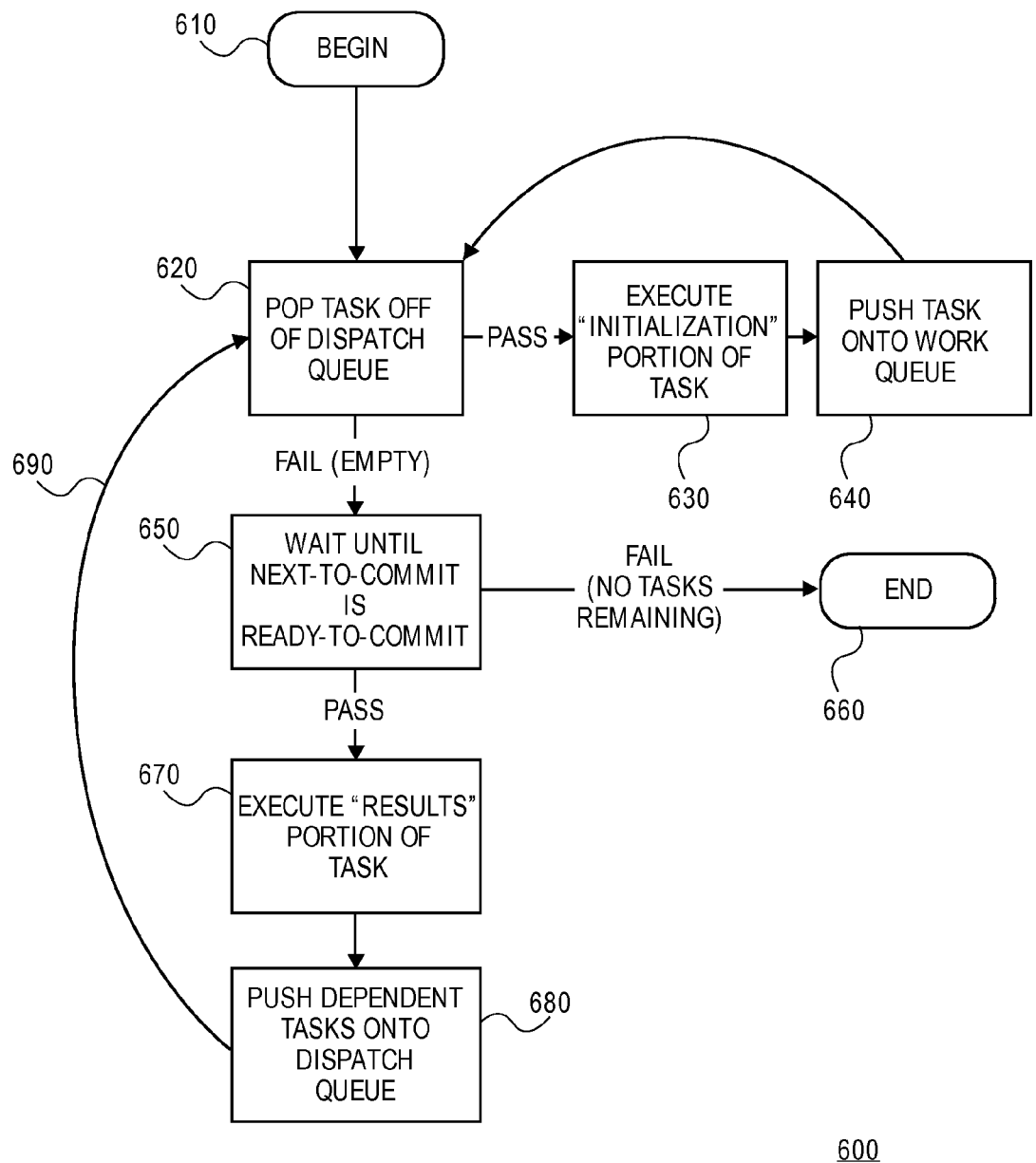
FIG. 6 depicts a flow diagram for dispatch task according to an embodiment of the present invention.

FIG. 6 depicts a flow diagram for dispatch task 600 according to an embodiment of the present invention. The Dispatch Thread is responsible for executing the "initialization" and "results" portion of each Task in the Canonical Order.

At 610, the process starts. In the dispatch thread, a local queue, called the Dispatch Queue, may be defined. In some embodiments, the Dispatch Queue may be initialized with all Tasks that have a null Dispatch Dependency in their Canonical Order.

At 620, one task is popped off the Dispatch Queue. If that task has an "Initialization" portion, it is executed 630. Then, the Task is pushed onto the Work Queue 640 and another Task is popped off the Dispatch Queue 620.

At 650, if the Dispatch Queue is empty, then the status of the "Next-to-Commit" Task is checked. If it is not yet "Ready-to-Commit", then it may wait.

At 670, when the Next-to-Commit Task reaches the "ready-to-commit" state, the "Results" portion of the task is executed. The Task's state is changed to "committed".

At 680, if the Task has any other Tasks with it as their Dispatch Dependency, then they are pushed onto the local Dispatch Queue. Finally, the Commit pointers are incremented. (e.g., the "last committed" becomes the Task that was just committed. The next-to-commit becomes the next Task in the canonical ordering.)

At 690, repeat the above, popping Tasks off the Dispatch Queue and waiting for the "Next-to-Commit" Task to be "Ready-to-Commit" until all Tasks have Committed.

Once all Tasks have been completed, concurrent operation is terminated and the overall algorithm is complete 660. In some embodiments, the Dispatch Thread may become a Worker Thread if it would otherwise become idle waiting for the next-to-commit Task to be ready-to-commit. In this embodiment of the invention, each Worker Thread checks for the existence of a Dispatch Thread whenever it changes the state of a Task to ready-to-commit. If none, it converts itself to become the Dispatch Thread. It is critical, in this embodiment, that only one thread be the Dispatch Thread.

The requirement for deterministic behavior is important for development and testing. However, it has no value to end users. In some embodiments, the Dispatch Thread can be designed to ignore the commit order based on a run-time switch. In this case, next-to-commit is determined by placing the Tasks in a list when they become ready to commit. The Dispatch Thread can select any of these Tasks when deciding which Task to commit.

Non-deterministic behavior has its own advantages. For example, if a bug is encountered, the application can automatically retry the same algorithm. If the algorithm in non-deterministic, then it is likely that it will take a different path through the code. If the bug is rare, it is likely that the same bug will not be encountered again. Thus, the algorithm is significantly more robust from the user's standpoint.

The non-deterministic behavior can be increased by intentionally making the commit order random. For example, rather than always selecting the first Task in a list, a random number function can be called to select the next Task to process from the Dispatch Queue or from the Ready-to-Commit list.

In an embodiment, use of the Canonical Ordering together with Dispatch Dependencies allows the problem domain to be partitioned but does not require an isolated partitioning. This increases the range of applications that can be made concurrent.

In an embodiment, this mechanism may be applied in any application areas, e.g., EDA application areas, that previously could not be made both concurrent and deterministic. In other embodiments any other computational intensive applications may also use this mechanism. All that is required is that the problem domain can be partitioned such that each transaction on the database is known prior to starting computations and the data needed by each transaction is known prior to starting computations.

FIGS. 7 through 37 illustrate an example according to an embodiment of the invention. These figures illustrate one example of the step by step process of parallel processing including simulated locking according to an embodiment of the invention.

Figure 7:
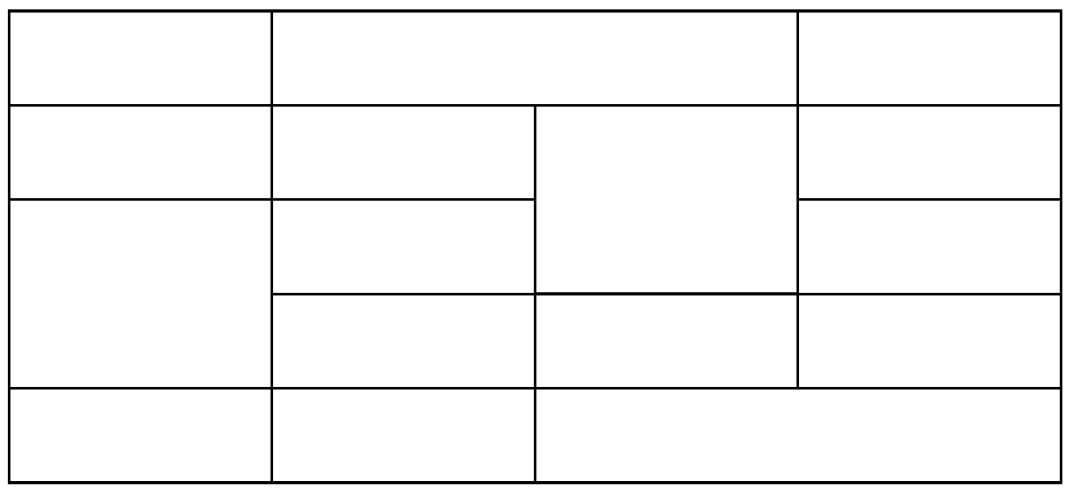

FIG. 7 shows an example of a problem domain area divided up into regions. In some embodiments, regions are subsets of the data objects or the data space. In the embodiment of EDA field using routers such as with an autorouter, regions are defined geometrically and are typically called "cells" or "tiles". In other embodiments, regions may be defined in terms of frequency ranges or time intervals or any other convenient divisions of the problem domain data.

FIG. 8 shows the regions identified as A through U. The identified regions are included in the decision queue in a canonical order. The task queue is initialized as empty. The committed queue is also set to empty. In an embodiment, the order may be alphabetical such as this case. In other embodiments, the order my be numerical or be related to the regions' relationship with each other. Any order may be used.

FIG. 9 shows each region determines its write regions and write blocked list. In this embodiment, for example, A would be associated with a list having C, D, E, G, L, M, N, S, T. This determination is done for all the regions.

FIG. 10 shows that A is popped off the decision queue and placed in the task queue with the #1 spot. Also, the neighboring regions set the write regions and write blocked lists. For example, regions C, D, E, G, L, M, N, S and T may put region A in their list as shown in their upper left corners. At this time, the committed list is empty.

FIG. 11 shows the next identified region in the decision queue is popped off the queue. In one embodiment, B is the identified region and is popped off the decision queue and placed in the task queue. All the neighboring regions of B gets B placed in their write blocked list. For example, K will have B and E will have A, B. The committed list is still empty.

FIG. 12 shows the next one in the decision queue is popped off the queue. In this case, C is popped off. A determination is made whether C is write-blocked. C is write-blocked by A. Thus, C is discarded from the decision queue and will be dealt with later. FIG. 13 shows the same situation as FIG. 12 except this time it is for D because it is write blocked by A and B.

FIG. 14 shows the example of going through the decision queue, E, F, G, H, I, J, K, L, M, and N where all those regions are discarded because they are write blocked. At this point, the Decision queue includes a list O, P, Q, R, S, T, U. The task queue is A and B. The committed queue is empty.

FIG. 15 shows the situation where O is popped off the decision queue because it is not blocked. Its neighbors J, F, and P will get an O in their write blocked list. O will be placed in the task queue at the #3 spot. The Decision queue includes a list P, Q, R, S, T, U. The task queue is A, B and O. The committed queue is empty.

Figure 16:
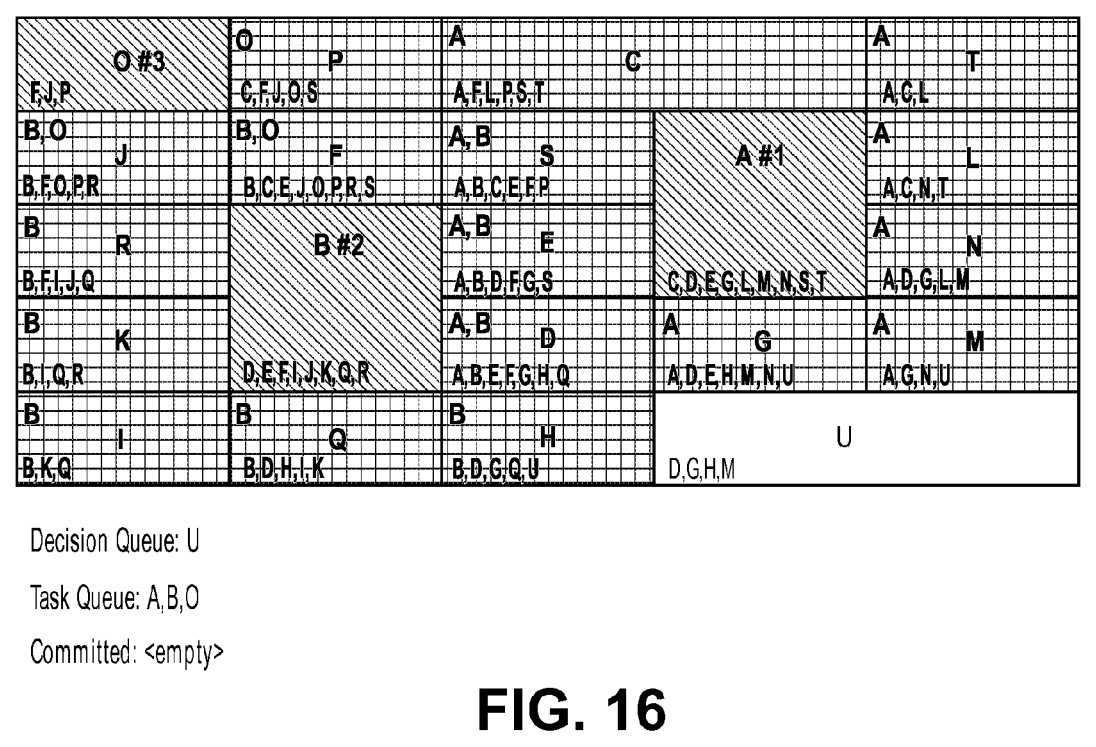

FIG. 16 shows that going through the simulated locking loops like before, P, Q, R, S, and T are all discarded for the reasons described above. At this point, the Decision queue includes a list with only U. The task queue is A, B and O. The committed queue is empty.

FIG. 17 shows popping off U from the decision queue because it is not blocked and placed in the task queue. D, G, H and M will get U in their write block list. U will be placed in the task queue and committed list will still be empty at this point in time. At this point, the Decision queue is empty. The task queue is A, B, O and U. The committed queue is empty.

FIG. 18 shows the next step after the decision queue is empty. The next one in the task queue is popped off the list and placed in the committed queue. In this case, it is A. A is then removed as shown by the black box in the figure. A is then removed from the write block lists because it no longer write blocks any regions. The regions that no longer have any write blocks are place in the decision queue in the canonical order that was decided before. In other embodiments, any ordering schemes may be used. In this embodiment, the new decision queue is a list having C, L, N, and T. The task queue includes B, O, and U and Committed queue has A.

Figure 19:
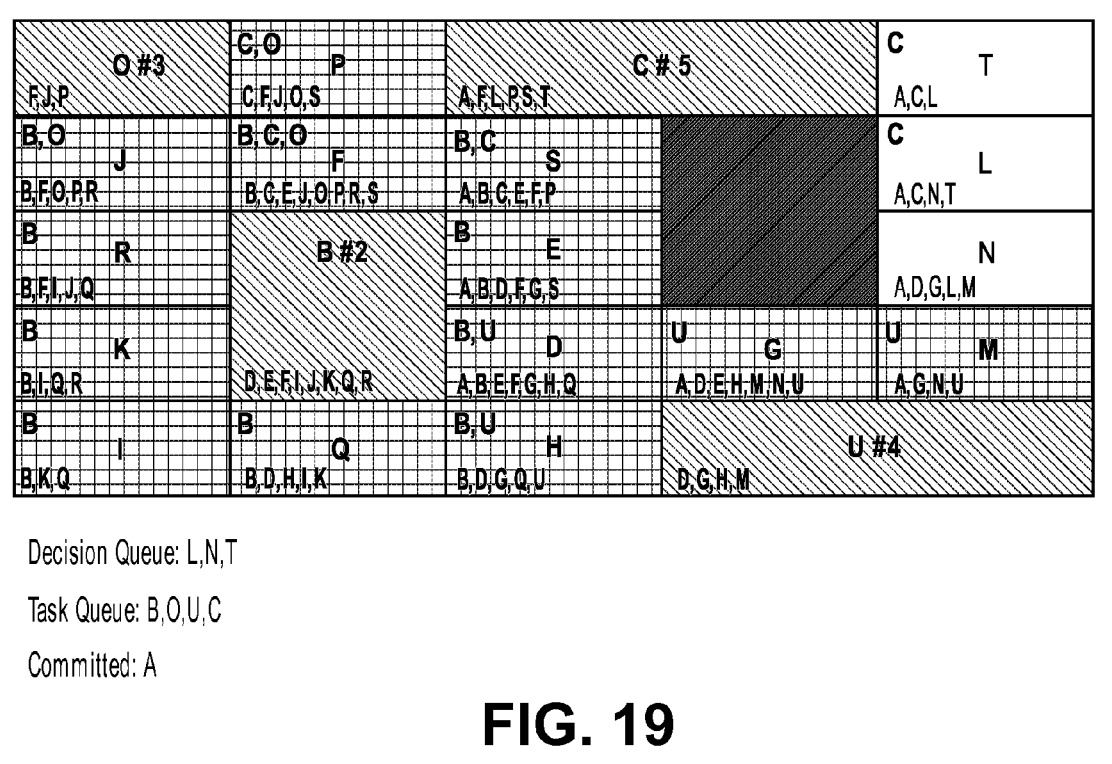

FIG. 19 shows the next region is popped off the decision queue. In this case, it is C, which is #5. C is placed in the task queue as #5, and P, F, S and T will now include a C in their write block list. At this point, the Decision queue includes a list L, N and T. The task queue is B, O, U and C. The committed queue is A.

Figure 20:
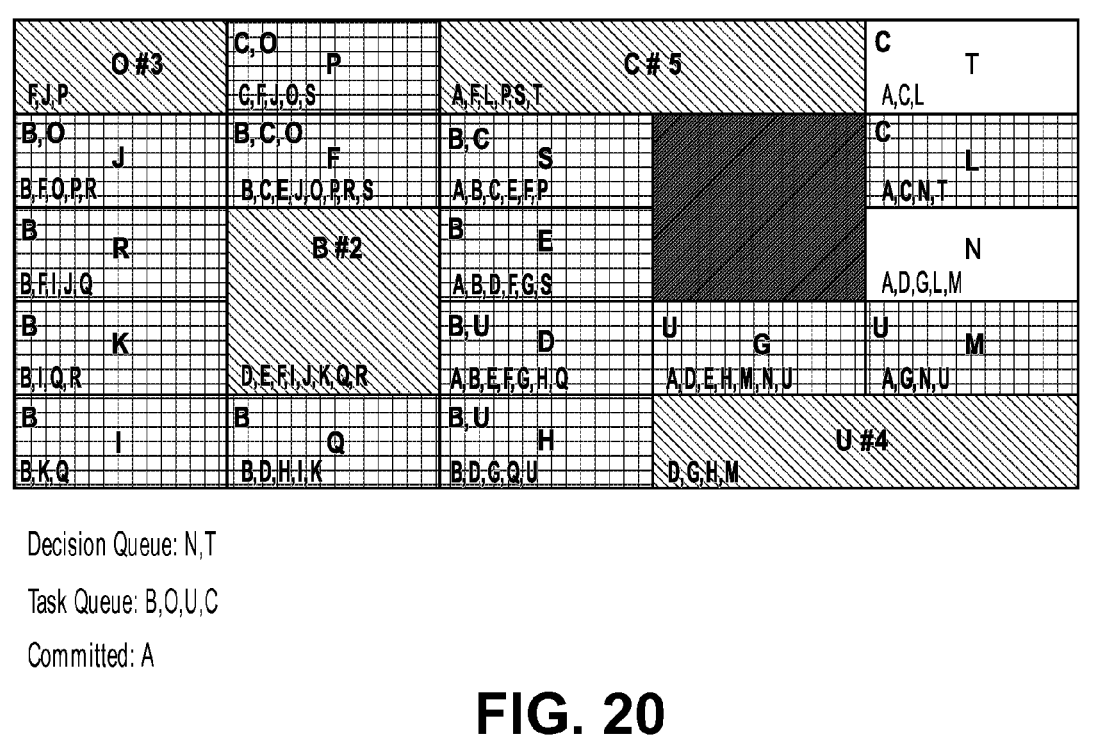

FIG. 20 shows that L is discarded because it is write-blocked. At this point, the Decision queue includes a list N and T. The task queue is B, O, U and C. The committed queue is A.

Figure 21:
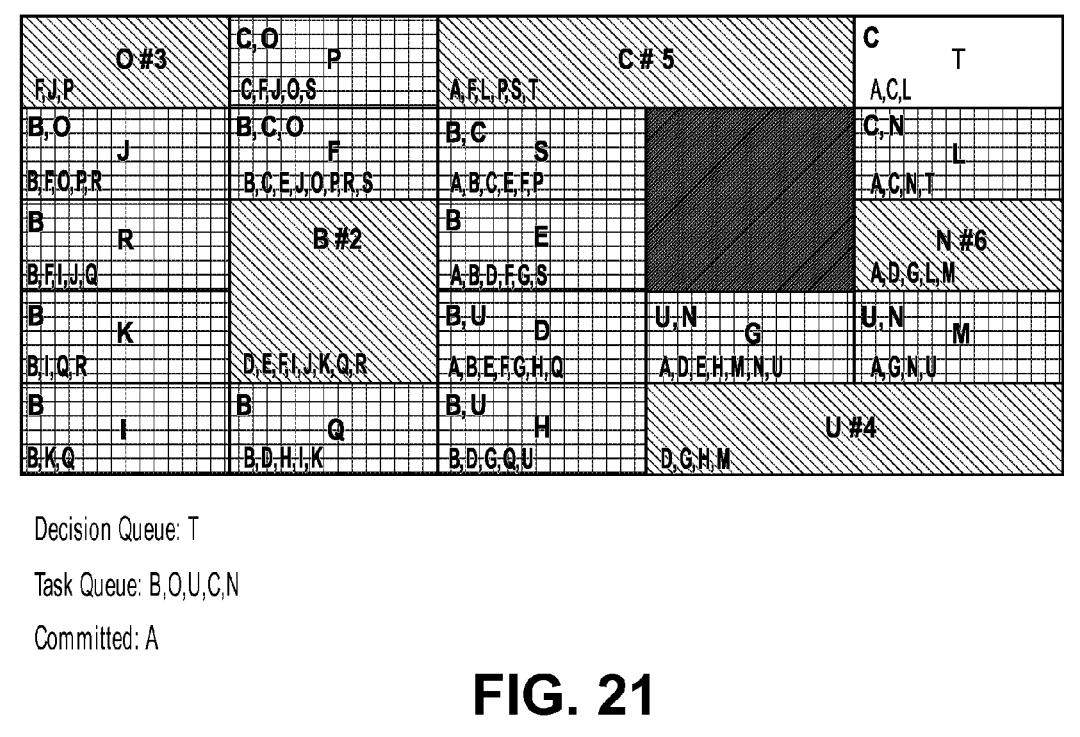

FIG. 21 shows that N is placed in the task queue as #6 and L, G and M receive an N in their write block lists. The committed queue still only includes an A at this point. At this point, the Decision queue includes a list T. The task queue is B, O, U, C and N. The committed queue is A.

Figure 22:
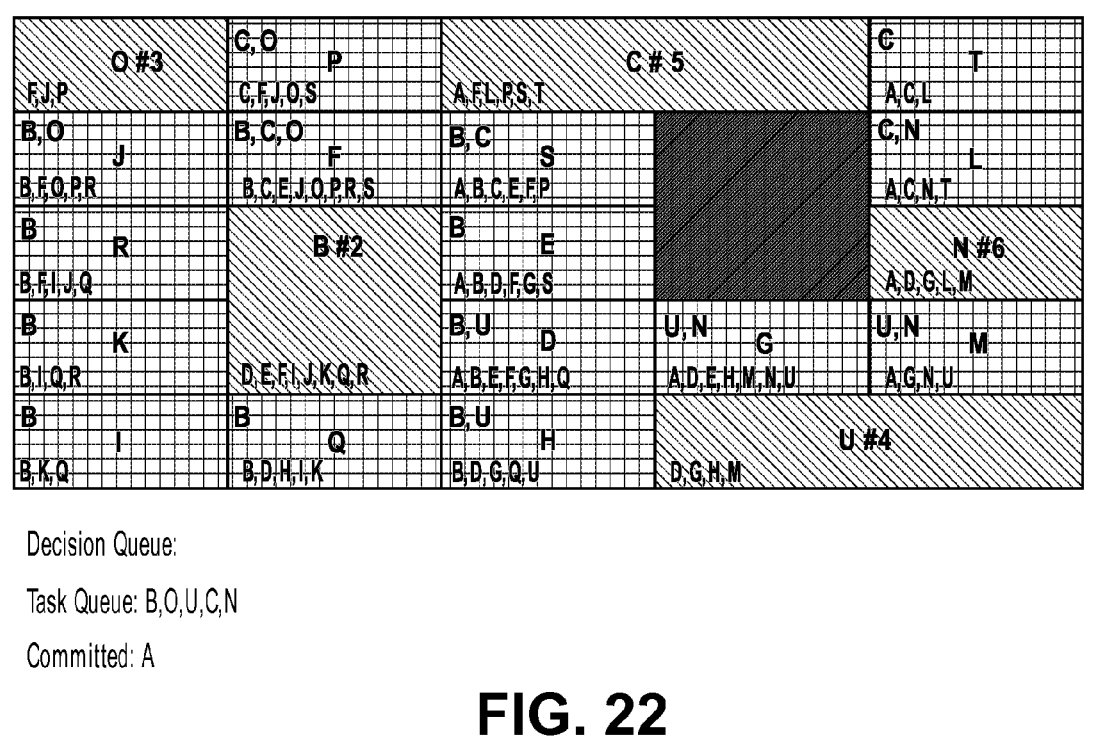

FIG. 22 shows that T is discarded from the decision queue because it is write-blocked. At this point, the Decision queue is empty. The task queue is B, O, U, C and N. The committed queue is A.

Figure 23:
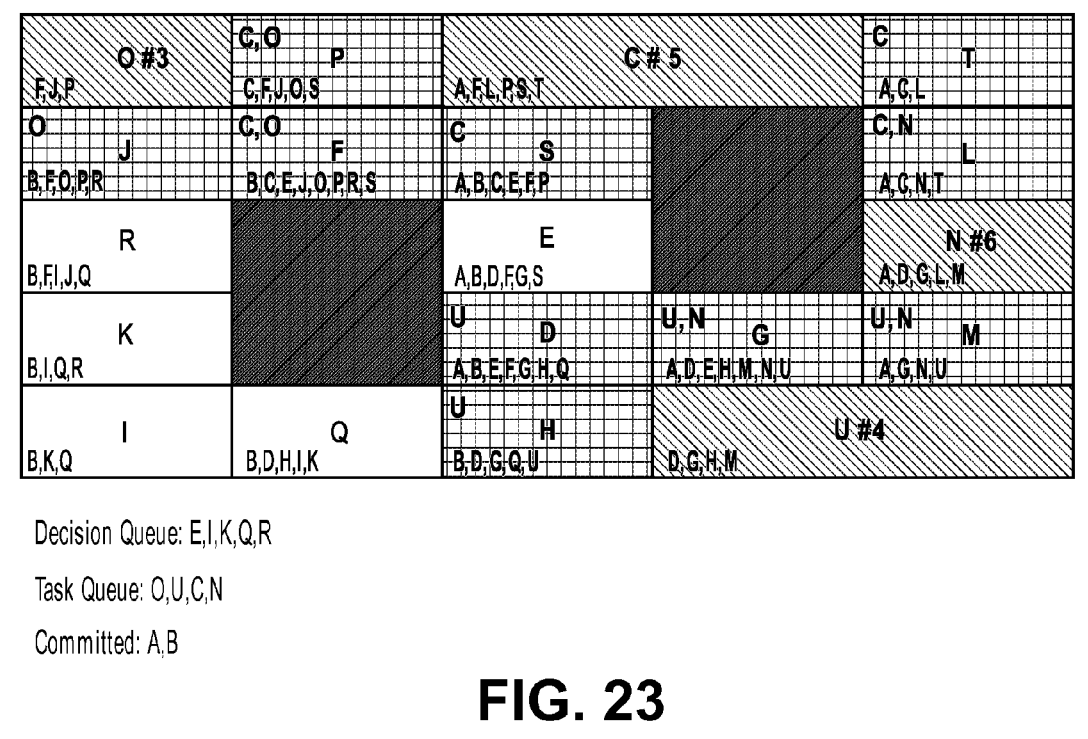

FIG. 23 shows that B is committed and removed from the regions. B is also removed from all the write block lists. In this case, E, I, K, Q, and R, now are not write blocked and are placed in the decision queue using any canonical ordering. Task queue now includes O, U, C and N. Committed queue includes A and B.

Figure 24:
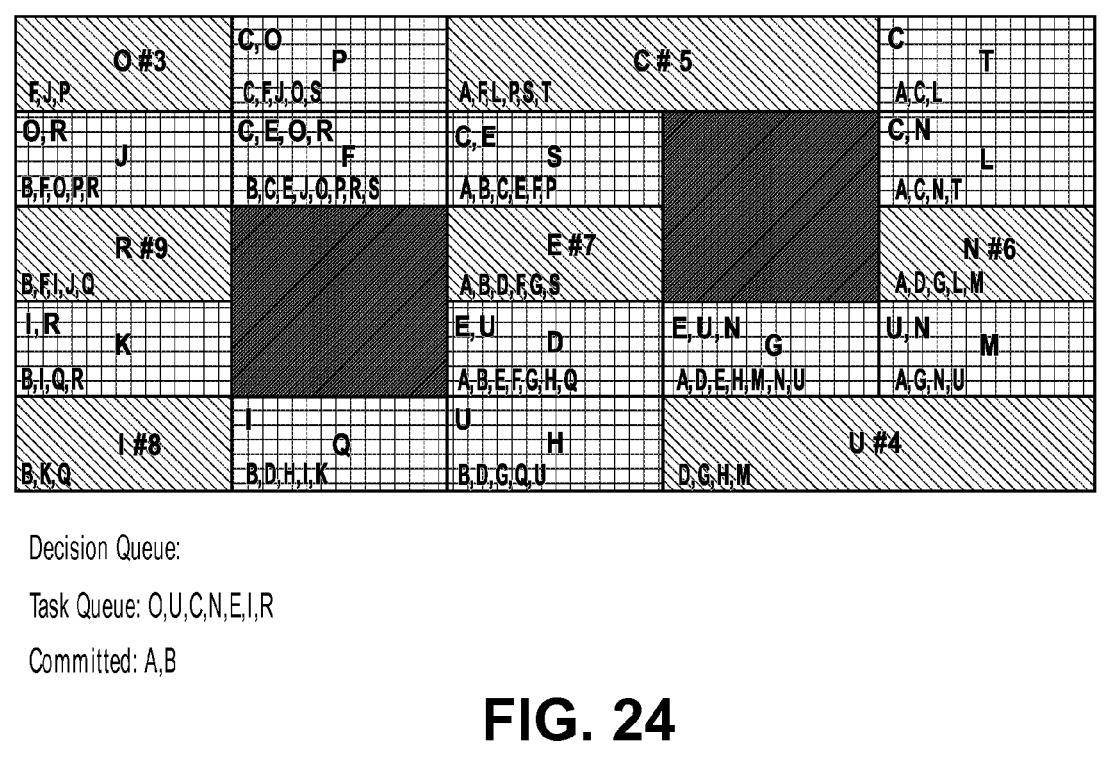

FIG. 24 shows that going down the decision queue and popping all the regions. The write blocked lists for neighboring regions are adjusted as explained in FIG. 4. The decision queue is empty. The task queue is now O, U, C, N, E, I, and R and committed queue is A and B.

Figure 25:
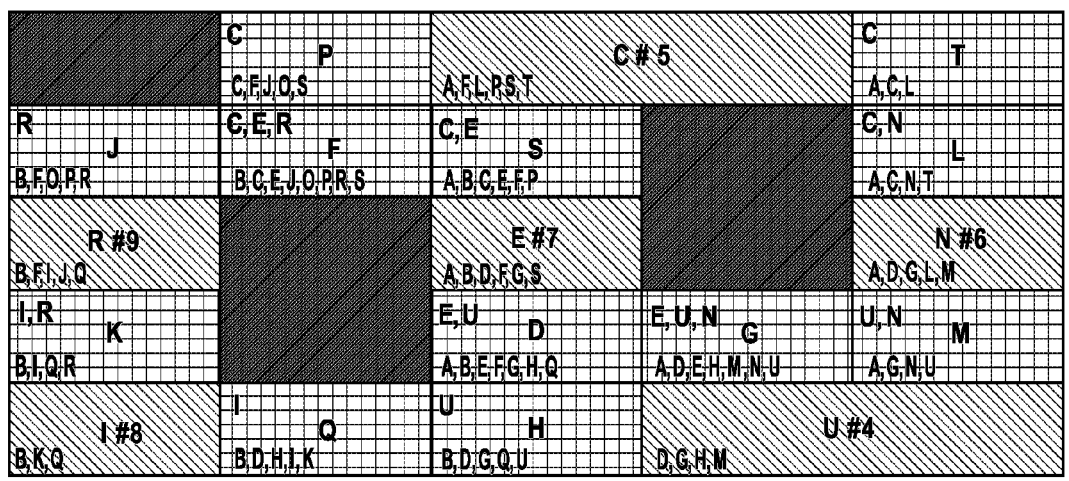

FIG. 25 shows that O is popped from the task queue and placed in the committed queue. O is removed from the problem domain and the write blocked lists of O's neighbors. The decision queue is empty. The task queue is now U, C, N, E, I, and R and committed queue is A, B and O.

Figure 26:
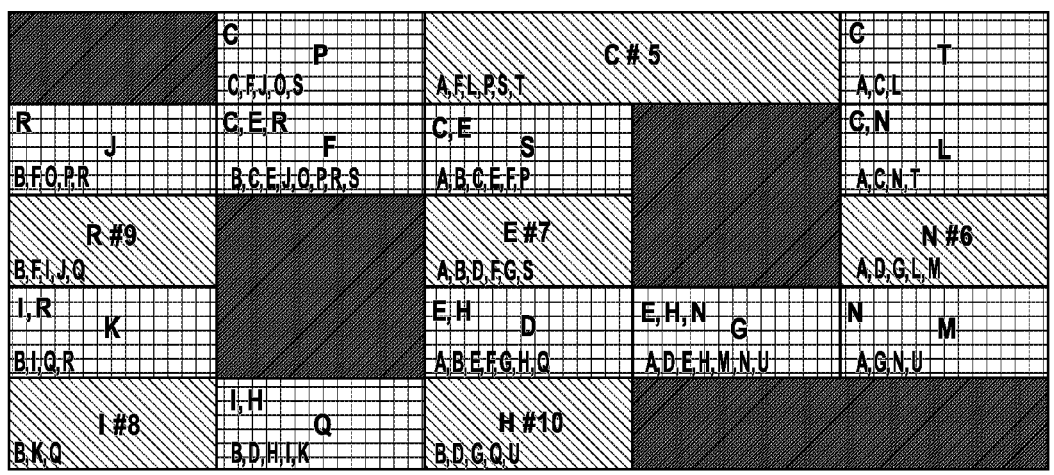

FIG. 26 shows that H is placed in the task queue as #10 because it is no longer write blocked. U is popped from the task queue and placed in the committed queue. U is removed from the problem domain and the write blocked lists of U's neighbors. Now the decision queue is empty. Task queue includes C, N, E, I, R, and H, and the committed queue has A, B, O, and U.

FIG. 27 shows that P and T are placed in the task queue as #11 and #12 because they are no longer write blocked. In this case, C is committed from the task queue, and removed from problem domain and its associated write blocked lists. The decision queue is empty. The task queue is now N, E, I, R, H, P and T and committed queue is A, B, O, U and C.

Figure 28:
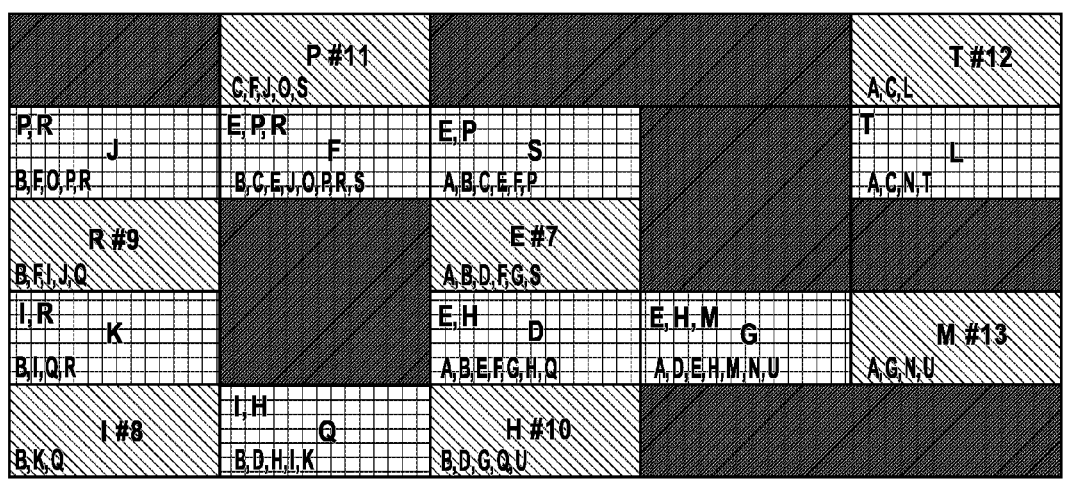

FIG. 28 shows N is committed. M is placed in the task queue as #13 and M is added to the write blocked list for region G. The decision queue is empty. The task queue is now E, I, R, H, P, T and M and committed queue is A, B, O, U, C and N.

Figure 29:
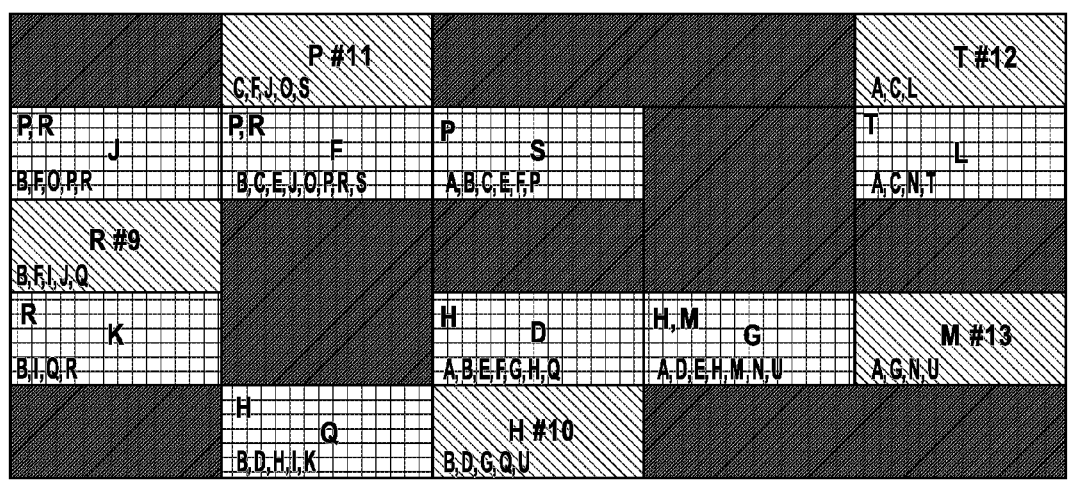

FIG. 29 shows E is committed. No regions are not write-blocked so I is committed to the committed queue. Now the committed queue is A, B, O, U, C, N, E and I. The task queue is R, H, P T and M. The decision queue is empty.

Figure 30:
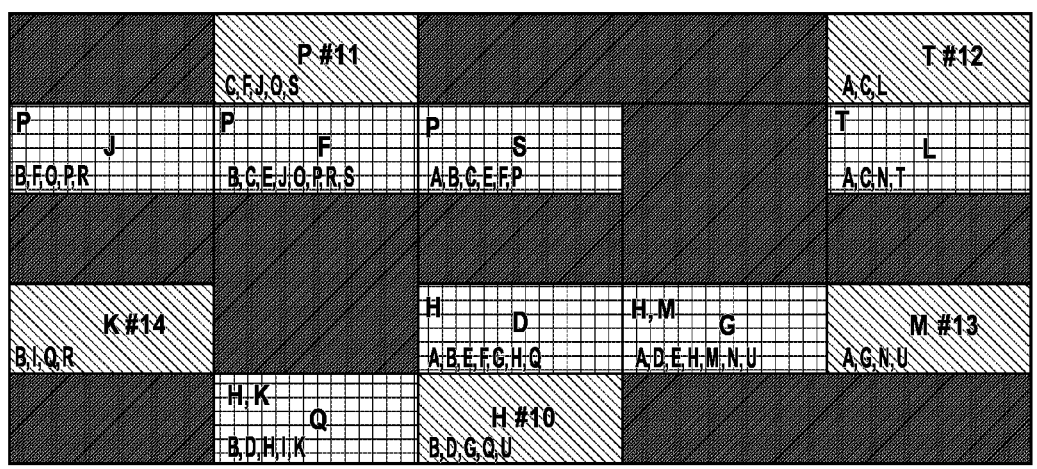

FIG. 30 shows R is added to the committed queue and K is added to the task queue as #14 and the write blocked lists are adjusted accordingly. The decision queue is empty. The task queue is now H, P, T, M and K and committed queue is A, B, O, U, C, N, E, I and R.

Figure 31:

FIG. 31 shows H is next to be added to the committed queue. D is added to the task queue as #15 and added to the write blocked lists of the neighbors. The decision queue is empty. The task queue is now P, T, M, K and D and committed queue is A, B, O, U, C, N, E, I, R and H.

Figure 32:
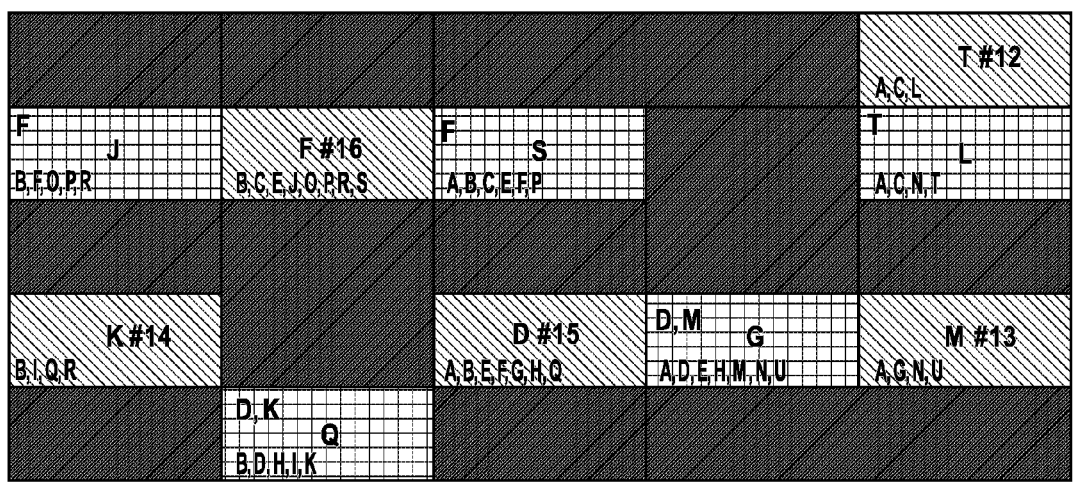

FIG. 32 shows P is added to the committed queue. F is added to the task queue and also added to J and S's write block lists. J and S are added to the decision queue. The decision queue is now J, S. The task queue is now T, M, K, D and F and committed queue is A, B, O, U, C, N, E, I, R, H and P.

Figure 33:
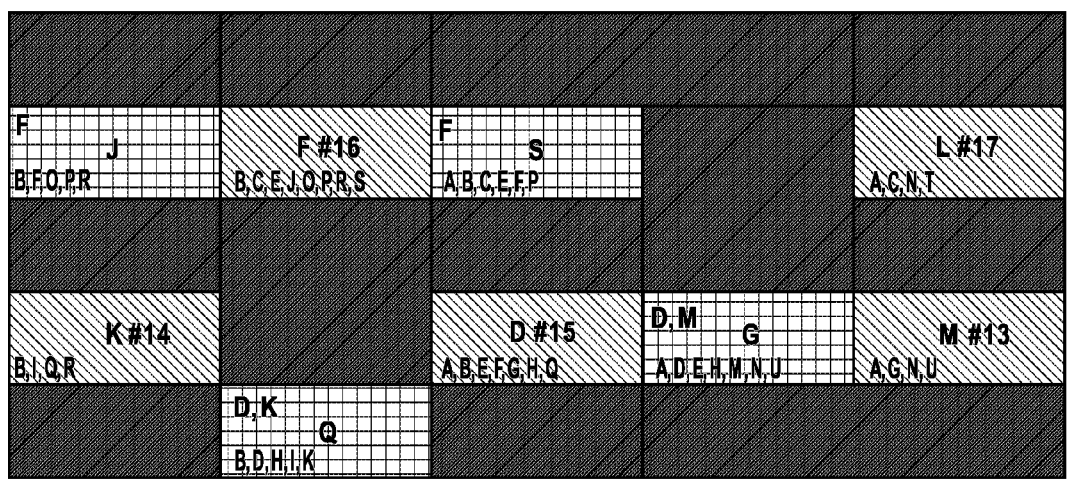

FIG. 33 shows that J and S are write-blocked so they are discarded from the decision queue. T is committed and L is added to the task queue as #17. The decision queue is empty. The task queue is M, K, D, F and L and committed queue is A, B, O, U, C, N, E, I, R, H, P and T.

Figure 34:
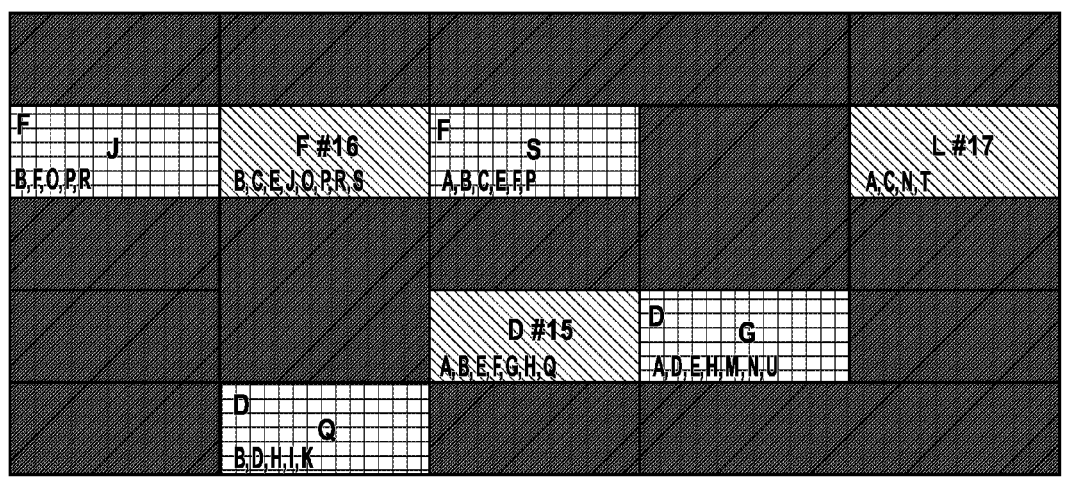

FIG. 34 shows that then M and K are committed. Now the decision queue is empty. Task queue is D, F, and L. The committed queue is A, B, O, U, C, N, E, I, R, H, P, T, M and K.

Figure 35:
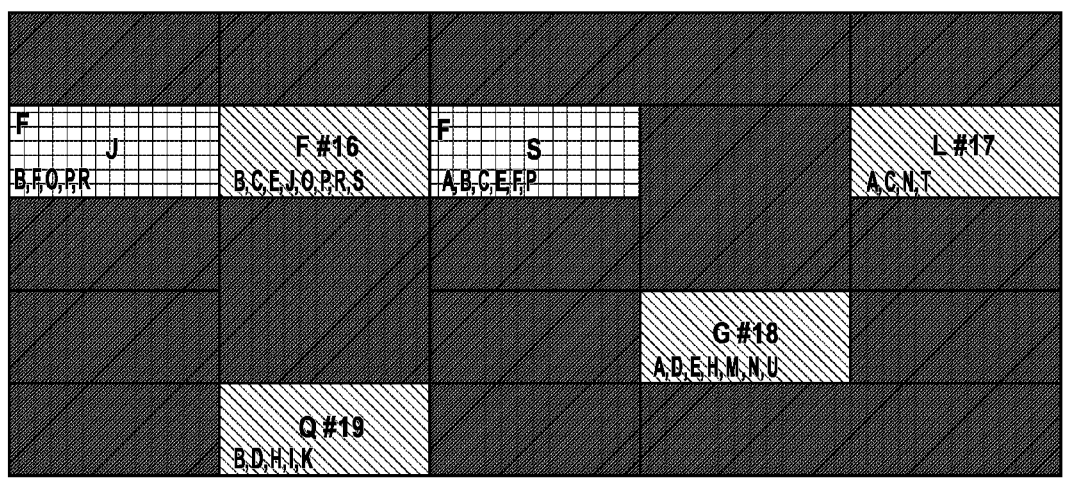

FIG. 35 shows that D is committed to the committed queue and removed from the write block lists. The Decision Queue is empty. Task queue is F, L, G and Q. The committed queue is A, B, O, U, C, N, E, I, R, H, P, T, M, K and D.

Figure 36:

FIG. 36 show that F is then able to be moved to the committed queue and removed from the write blocked lists of J and S which are set to task queue as #20 and #21 respectively. The Decision Queue is empty. Task queue is L, G, Q, J and S. The committed queue is A, B, O, U, C, N, E, I, R, H, P, T, M, K, D and F.

Figure 37:
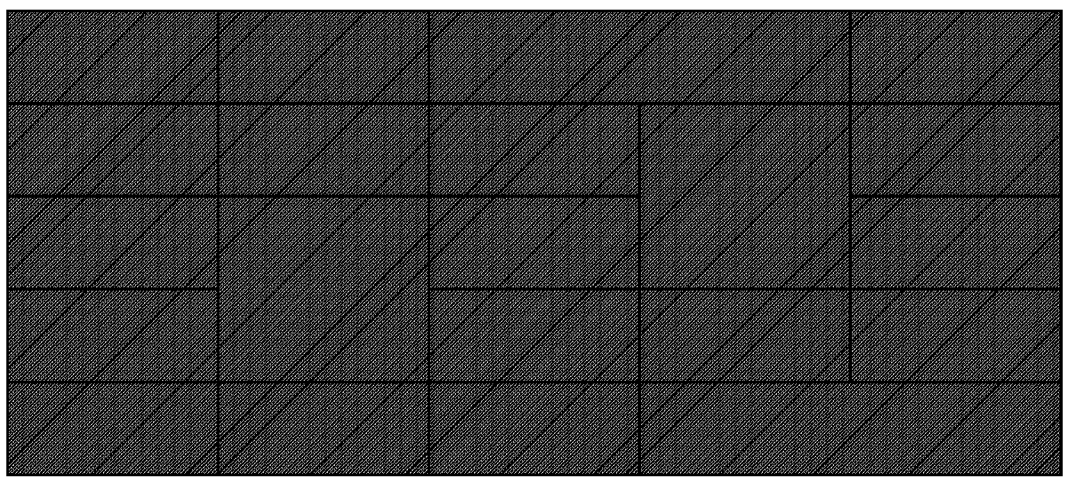

FIG. 37 shows that all the task queue regions can be moved to the committed queue. Both the Decision queue and Task queue are empty. So the final committed order of the Committed queue is A, B, O, U, C, N, E, I, R, H, P, T, M, K, D, F, L, G, Q, J and S. The processing thus begins following this ordering, which prevents read blocking and write blocking of the regions.

The embodiments can be used for any type of design activities, including cell phones designs, hardware design, software design, and designs including both hardware and software such as hardware/software co-design activities. For example, some embodiments of the invention can be applied to the design of embedded software and systems, which includes communication systems such as encoders/decoders, automotive control systems such as ABS or cruise controllers, avionic controllers, as well as any other systems that includes embedded software.

Figure 38:
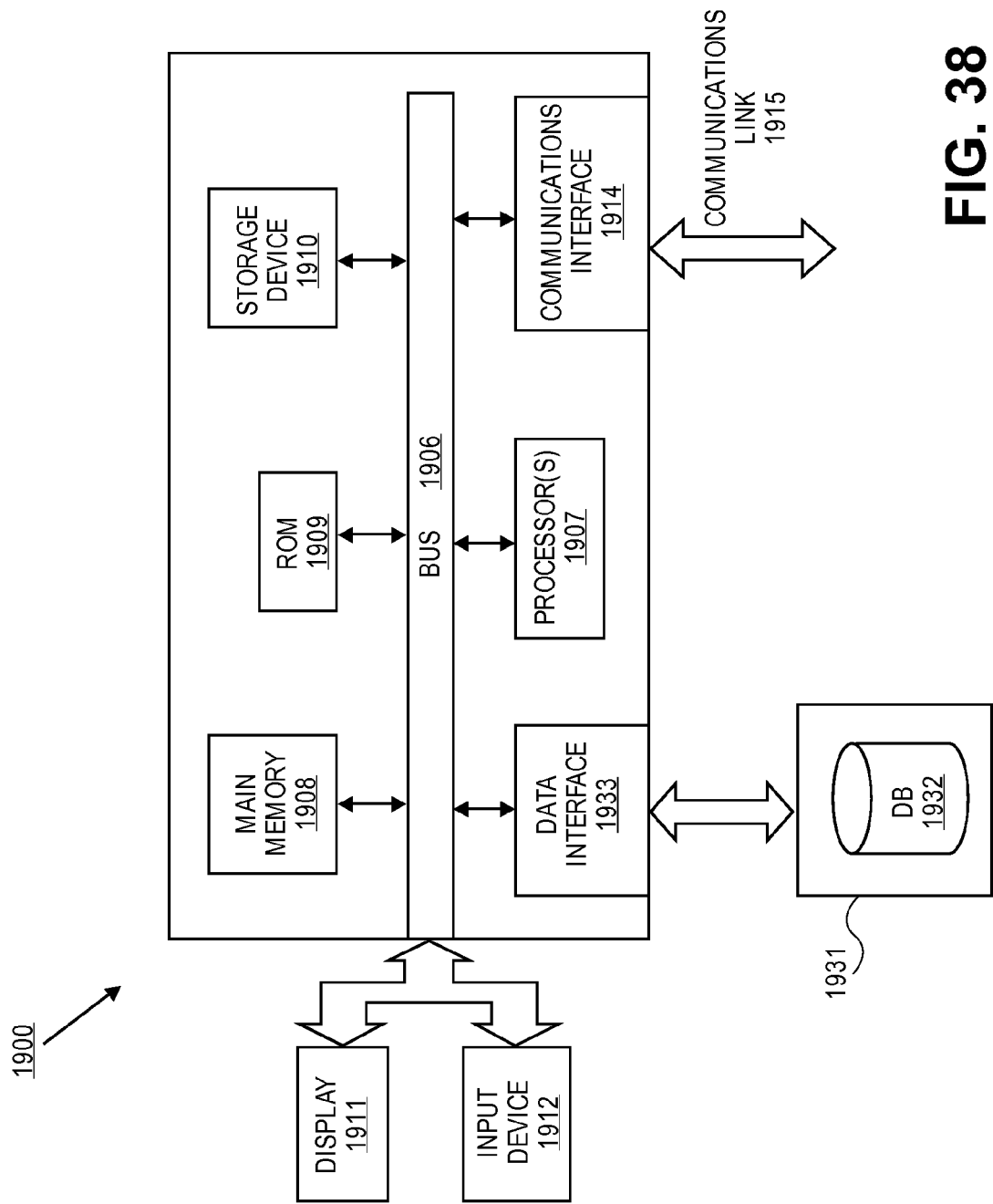
FIG. 38 depicts a computerized system on which a method for code generation may be implemented.

FIG. 38 depicts a computerized system on which a method for parallel execution of intensive applications may be implemented. The execution of the sequences of instructions required to practice the embodiments may be performed by a computer system 1900 as shown in FIG. 38. In an embodiment, execution of the sequences of instructions is performed by a single computer system 1900. According to other embodiments, two or more computer systems 1900 coupled by a communication link 1915 may perform the sequence of instructions in coordination with one another. Although a description of only one computer system 1900 will be presented below, however, it should be understood that any number of computer systems 1900 may be employed to practice the embodiments.

A computer system 1900 according to an embodiment will now be described with reference to FIG. 38, which is a block diagram of the functional components of a computer system 1900. As used herein, the term computer system 1900 is broadly used to describe any computing device that can store and independently run one or more programs.

Each computer system 1900 may include a communication interface 1914 coupled to the bus 1906. The communication interface 1914 provides two-way communication between computer systems 1900. The communication interface 1914 of a respective computer system 1900 transmits and receives electrical, electromagnetic or optical signals, which include data streams representing various types of signal information, e.g., instructions, messages and data. A communication link 1915 links one computer system 1900 with another computer system 1900. For example, the communication link 1915 may be a LAN, in which case the communication interface 1914 may be a LAN card, or the communication link 1915 may be a PSTN, in which case the communication interface 1914 may be an integrated services digital network (ISDN) card or a modem, or the communication link 1915 may be the Internet, in which case the communication interface 1914 may be a dial-up, cable or wireless modem.

A computer system 1900 may transmit and receive messages, data, and instructions, including program, i.e., application, code, through its respective communication link 1915 and communication interface 1914. Received program code may be executed by the respective processor(s) 1907 as it is received, and/or stored in the storage device 1910, or other associated non-volatile media, for later execution.

In an embodiment, the computer system 1900 operates in conjunction with a data storage system 1931, e.g., a data storage system 1931 that contain a database 1932 that is readily accessible by the computer system 1900. The computer system 1900 communicates with the data storage system 1931 through a data interface 1933. A data interface 1933, which is coupled to the bus 1906, transmits and receives electrical, electromagnetic or optical signals, which include data streams representing various types of signal information, e.g., instructions, messages and data. In embodiments, the functions of the data interface 1933 may be performed by the communication interface 1914.

Computer system 1900 includes a bus 1906 or other communication mechanism for communicating instructions, messages and data, collectively, information, and one or more processors 1907 coupled with the bus 1906 for processing information. Computer system 1900 also includes a main memory 1908, such as a random access memory (RAM) or other dynamic storage device, coupled to the bus 1906 for storing dynamic data and instructions to be executed by the processor(s) 1907. The main memory 1908 also may be used for storing temporary data, i.e., variables, or other intermediate information during execution of instructions by the processor(s) 1907.

The computer system 1900 may further include a read only memory (ROM) 1909 or other static storage device coupled to the bus 1906 for storing static data and instructions for the processor(s) 1907. A storage device 1910, such as a magnetic disk or optical disk, may also be provided and coupled to the bus 806 for storing data and instructions for the processor(s) 1907.

A computer system 1900 may be coupled via the bus 1906 to a display device 1911, such as, but not limited to, a cathode ray tube (CRT), for displaying information to a user. An input device 1912, e.g., alphanumeric and other keys, is coupled to the bus 1906 for communicating information and command selections to the processor(s) 1907.

According to one embodiment, an individual computer system 1900 performs specific operations by their respective processor(s) 1907 executing one or more sequences of one or more instructions contained in the main memory 1908. Such instructions may be read into the main memory 1908 from another computer-usable medium, such as the ROM 1909 or the storage device 1910. Execution of the sequences of instructions contained in the main memory 1908 causes the processor(s) 1907 to perform the processes described herein. In alternative embodiments, hard-wired circuitry may be used in place of or in combination with software instructions. Thus, embodiments are not limited to any specific combination of hardware circuitry and/or software.

The term "computer-usable medium," as used herein, refers to any medium that provides information or is usable by the processor(s) 1907. Such a medium may take many forms, including, but not limited to, non-volatile, volatile and transmission media. Non-volatile media, i.e., media that can retain information in the absence of power, includes the ROM 1909, CD ROM, magnetic tape, and magnetic discs. Volatile media, i.e., media that cannot retain information in the absence of power, includes the main memory 1908. Transmission media includes coaxial cables, copper wire and fiber optics, including the wires that comprise the bus 1906. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than in a restrictive sense.

What is claimed is:

1. A method for parallel processing comprising:
 decomposing a problem domain into at least a first task operating on a first region and a second task operating on a second region, in which the first region and the second region are subsets of data of a data set and overlap each other;

analyzing the problem domain using simulated locking based at least in part upon the first region and the second region and the at least the first task and the second task;

associating a first permit with the first task and a second permit with the second task, in which the first permit and the second permit respectively define what data to process for the first task and the second task;

associating multiple regions with the first permit, in which the multiple regions include one or more goal regions, one or more writable regions, or one or more readable regions, wherein the one or more goal regions are a subset of the one or more writable regions which are a subset of the one or more readable regions;

determining dispatch dependencies and a commit order of the first region and the second region based at least in part upon the simulated locking utilizing the second permit and the multiple regions associated with the first permit, rather than upon using one or more locks that block access to at least one of the first region and the second region until the one or more locks are released; and executing, by using a processor, the first task and the second task, which respectively operate on the first region and the second region that overlap each other, concurrently with the determined dispatch dependencies and the commit order.

2. The method of claim 1, wherein the simulated locking further comprising:
determining if the first region or the second region is blocked;
setting the dispatch dependencies; and
determining a canonical order.

3. The method of claim 2, further comprising: adding the set dispatch dependencies to the canonical ordering.

4. The method of claim 3, further comprising controlling concurrency scheduling using the dispatch dependencies.

5. The method of claim 1, further comprising making a run-time selection between deterministic and non-deterministic behavior for the first task and the second task respectively operating on the first region and the second region.

6. The method of claim 1, wherein the problem domain comprises an application area of electronic design.

7. An apparatus for parallel processing comprising:
a processor that is to:
decompose a problem domain into at least a first task operating on a first region and a second task operating on a second region, in which the first region and the second region are subsets of data of a data set and overlap each other;
analyze the problem domain using simulated locking based at least in part upon the first region and the second region and at least the first task and the second task;
associate a first permit with the first task and a second permit with the second task, in which the first permit and the second permit respectively define what data to process for the first task and the second task;
associate multiple regions with the first permit, in which the multiple regions include one or more goal regions, one or more writable regions, or one or more readable regions, wherein the one or more goal regions are a subset of the one or more writable regions which are a subset of the one or more readable regions;
determine dispatch dependencies and a commit order of the first region and the second region based at least in part upon the simulated locking utilizing the second permit and the multiple regions associated with the first permit, rather than upon using one or more locks that block access to at least one of the first region and the second region until the one or more locks are released; and
execute the first task and the second task, which respectively operate on the first region and the second region that overlap each other, concurrently with the determined dispatch dependencies and the commit order.

8. The apparatus of claim 7, wherein the simulated locking further comprising:
a decision queue to determine if the first region or the second region is blocked;
a task queue to set the dispatch dependencies; and
a commit queue to determine a canonical order.

9. The apparatus of claim 8, in which the processor adds the dispatch dependencies to the canonical ordering.

10. The apparatus of claim 9, in which the dispatch dependencies controls concurrency scheduling.

11. The apparatus of claim 7, in which the processor provides a run-time selection between deterministic and non-deterministic behavior for the first task and the second task respectively operating on the at least the first region and the second region.

12. The apparatus of claim 7, wherein the problem area comprises an application area of electronic design.

13. A computer program product that includes a non-transitory computer-usable medium having a sequence of instructions which, when executed by a processor, causes the processor to execute a process for parallel processing, the process comprising:
decomposing a problem domain into at least a first task operating on a first region and a second task operating on a second region, in which the first region and the second region are subsets of data of a data set and overlap each other;
analyzing the problem domain using simulated locking based at least in part upon the first region and the second region and the at least the first task and the second task;
associating a first permit with the first task and a second permit with the second task, in which the first permit and the second permit respectively define what data to process for the first task and the second task;
associating multiple regions with the first permit, in which the multiple regions include one or more goal regions, one or more writable regions, or one or more readable regions, wherein the one or more goal regions are a subset of the one or more writable regions which are a subset of the one or more readable regions;
determining dispatch dependencies and a commit order of the first region and the second region based at least in part upon the simulated locking utilizing the second permit and the multiple regions associated with the first permit, rather than upon using one or more locks that block access to at least one of the first region and the second region until the one or more locks are released; and
executing the first task and the second task, which respectively operate on the first region and the second region that overlap each other, concurrently with the determined dispatch dependencies and the commit order.

14. The product of claim 13, wherein the simulated locking further comprising:
determining if the first region or the second region is blocked;
setting the dispatch dependencies; and
determining a canonical order.

15. The product of claim 14, further comprising:
adding the set dispatch dependencies to the canonical ordering.

16. The product of claim 15, further comprising controlling concurrency scheduling using the dispatch dependencies.

17. The product of claim 13, further comprising making a run-time selection between deterministic and non-deterministic behavior for the at least the first task and the second task respectively operating on the first region and the second.

18. The product of claim 13, wherein the problem area comprises an application area of electronic design.

* * * * *